(12) United States Patent
Greiner et al.

(10) Patent No.: US 8,527,715 B2
(45) Date of Patent: Sep. 3, 2013

(54) PROVIDING A SHARED MEMORY TRANSLATION FACILITY

(75) Inventors: Dan F. Greiner, San Jose, CA (US); Lisa C. Heller, Rhinebeck, NY (US); Damian L. Osisek, Vestal, NY (US); Erwin Pfeffer, Petermichaiweg (DE); Donald W. Schmidt, Stone Ridge, NY (US); Jaya Srikrishnan, Wappingers Falls, NY (US); Charles F. Webb, Wappingers Falls, NY (US); Leslie W. Wyman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 12/037,177

(22) Filed: Feb. 26, 2008

(65) Prior Publication Data

US 2009/0216963 A1 Aug. 27, 2009

(51) Int. Cl.
*G06F 13/00* (2006.01)

(52) U.S. Cl.
USPC .................................. 711/153; 711/E12.013

(58) Field of Classification Search
None
See application file for complete search history.

(56) References Cited

U.S. PATENT DOCUMENTS

| | | | |
|---|---|---|---|
| 4,792,895 A | 12/1988 | Tallman | |
| 4,843,541 A | 6/1989 | Bean et al. | |
| 5,222,215 A | 6/1993 | Chou et al. | |
| 5,317,705 A | 5/1994 | Gannon et al. | |
| 5,381,535 A | 1/1995 | Gum et al. | |
| 5,428,757 A | 6/1995 | Sutton | |
| 5,530,820 A | 6/1996 | Onodera | |
| 5,555,414 A | 9/1996 | Hough et al. | |
| 5,574,878 A | 11/1996 | Onodera et al. | |
| 5,574,936 A | 11/1996 | Ryba et al. | |
| 5,584,042 A * | 12/1996 | Cormier et al. | 710/36 |
| 5,652,853 A * | 7/1997 | Duvalsaint et al. | 711/203 |
| 6,119,219 A | 9/2000 | Webb et al. | |
| 6,378,027 B1 | 4/2002 | Bealkowski et al. | |
| 6,453,392 B1 | 9/2002 | Flynn, Jr. | |
| 6,493,741 B1 | 12/2002 | Emer et al. | |
| 6,493,816 B1 * | 12/2002 | Munroe et al. | 711/209 |
| 6,604,185 B1 | 8/2003 | Fromm | |
| 6,671,795 B1 | 12/2003 | Marr et al. | |
| 6,728,746 B1 * | 4/2004 | Murase et al. | 718/1 |

(Continued)

OTHER PUBLICATIONS

"IBM® z/Architecture Principles of Operation", Publication No. SA22-7832-05, 6th Edition, Apr. 2007. 1,215 pages separated into 4 electronic attachments.

(Continued)

*Primary Examiner* — Edward Dudek, Jr.
*Assistant Examiner* — Sean D Rossiter
(74) *Attorney, Agent, or Firm* — Cantor Colburn LLP; John Campbell

(57) ABSTRACT

A system, method and computer program product for providing a shared memory translation facility. The method includes receiving a request for access to a memory address from a requestor at a configuration, the receiving at a shared memory translation mechanism. It is determined if the memory address refers to a shared memory object (SMO), the SMO accessible by a plurality of configurations. In response to determining that the memory address refers to the SMO, it is determined if the configuration has access to the SMO. In response to determining that the configuration has access to the SMO, the requestor is provided a system absolute address for the SMO and access to the SMO. In this manner direct interchange of data between the plurality of configurations is allowed.

17 Claims, 3 Drawing Sheets

| S | SMTX | SMIN | Object Byte Index (OBX) |
|---|---|---|---|
| 0 1 | | J    K | 63 |

(56) References Cited

U.S. PATENT DOCUMENTS

| | | |
|---|---|---|
| 6,959,352 B1 | 10/2005 | Dickey |
| 7,167,956 B1* | 1/2007 | Wright et al. ............... 711/141 |
| 7,234,037 B2 | 6/2007 | Errickson et al. |
| 7,275,181 B2 | 9/2007 | Staiger |
| 7,321,369 B2 | 1/2008 | Wyatt et al. |
| 2002/0052914 A1 | 5/2002 | Zalewski et al. |
| 2002/0083258 A1 | 6/2002 | Bauman et al. |
| 2003/0009648 A1 | 1/2003 | Doing et al. |
| 2003/0037089 A1 | 2/2003 | Cota-Robles et al. |
| 2003/0037178 A1 | 2/2003 | Vessey et al. |
| 2004/0143712 A1* | 7/2004 | Armstrong et al. ......... 711/152 |
| 2004/0230976 A1 | 11/2004 | Slegel et al. |
| 2005/0102670 A1* | 5/2005 | Bretl et al. .................. 718/1 |
| 2005/0114855 A1* | 5/2005 | Baumberger ................ 718/1 |
| 2005/0132249 A1* | 6/2005 | Burton et al. ............... 714/5 |
| 2005/0144402 A1* | 6/2005 | Beverly ...................... 711/152 |
| 2005/0223005 A1* | 10/2005 | Shultz et al. ................ 707/8 |
| 2006/0036824 A1 | 2/2006 | Greiner et al. |
| 2006/0259710 A1 | 11/2006 | Gimpl et al. |
| 2006/0259818 A1 | 11/2006 | Howell et al. |
| 2007/0050764 A1 | 3/2007 | Traut |
| 2007/0067775 A1* | 3/2007 | Shultz et al. ................ 718/102 |
| 2007/0089111 A1 | 4/2007 | Robinson et al. |
| 2007/0113217 A1 | 5/2007 | Gish et al. |
| 2007/0118700 A1* | 5/2007 | Mensching et al. ......... 711/147 |
| 2007/0157198 A1 | 7/2007 | Bennett et al. |
| 2008/0046885 A1* | 2/2008 | Shultz et al. ................ 718/1 |
| 2008/0086729 A1* | 4/2008 | Kondoh et al. .............. 718/1 |
| 2009/0216929 A1 | 8/2009 | Heller |
| 2009/0216995 A1 | 8/2009 | Heller |
| 2009/0217264 A1 | 8/2009 | Heller |
| 2009/0217269 A1 | 8/2009 | Heller et al. |

OTHER PUBLICATIONS

U.S. Appl. No. 12/037,887 Final Office Action dated Dec. 9, 2010.
U.S. Appl. No. 12/037,887 Non Final Office Action dated Jun. 14, 2010.
U.S. Appl. No. 12/037,808 Final Office Action dated Sep. 28, 2010.
U.S. Appl. No. 12/037,808 Non Final Office Action dated Feb. 17, 2011.
U.S. Appl. No. 12/037,808 Non Final Office Action dated Apr. 27, 2010.
U.S. Appl. No. 12/037,897 Final Office Action dated Jan. 31, 2011.
U.S. Appl. No. 12/037,897 Non Final Office Action dated Sep. 23, 2010.
"IBM z/Architecture Principles of Operation"; Publication No. SA22-7832-05; 6th Edition; Apr. 2007; 1,215 pages separated into 4 Electronic Attachments—Relevant pages—Chapter 2—Organization and Chapter 3—Storage.
U.S. Appl. No. 12/037,808 Notice of Allowance dated Nov. 16, 2011.
U.S. Appl. No. 13/372,603 Notice of Allowance dated Jul. 31, 2012, 14 pages.
U.S. Appl. No. 12/037,887 Notice of Allowance dated Oct. 10, 2012, 23 pages.
U.S. Appl. No. 12/037,887 Non Final Office Action dated Sep. 24, 2012, 25 pages.
U.S. Appl. No. 12/037,897 Notice of Allowance dated Feb. 6, 2013, 10 pages.

* cited by examiner

| S | SMTX | SMIN | Object Byte Index (OBX) |
|---|---|---|---|
| 0 1 | | J   K | 63 |

FIG. 2

| V | System-Absolute Object Origin | ///////// | DRZ |
|---|---|---|---|
| / | System-Absolute Object Limit | ///////////// | IN |
| Access-Control Bits (one bit per partition) ||||
| Store-Protection Bits (one bit per partition) ||||
| 0 1 | | L    M | N<br>63 |

FIG. 3

PROVIDING A SHARED MEMORY TRANSLATION FACILITY

BACKGROUND OF THE INVENTION

This invention relates generally to memory, and more particularly to providing a shared memory translation facility.

Computing applications have long required the ability to communicate with other computing applications. A simple example of such communication is an application that produces a report (e.g., a payroll program) sending that report to a spooling subsystem for subsequent printing. As mainframe computing environments grew from a single physical system to multiple systems, the need to communicate between applications—potentially running on separate systems—also expanded. Initially, the IBM S/360 provided parallel channel to channel adapters that allowed separate physical systems to communicate messages between each other. Subsequent IBM systems have provided serial channel to channel adapters and open systems adapters to effect such cross system communications at higher speeds. Modern inter application communications use advanced message queuing and sophisticated data sharing techniques.

Virtualization techniques allow multiple images of a computing system (called configurations) to execute on the same physical system. Virtualization allows contemporary operating systems such as z/OS, z/VM, z/Linux, and transaction processing facility (TPF) to operate concurrently on the same physical system. The process resource/systems manager (PR/SM) hypervisor provides the means by which multiple configurations can execute within separate logical partitions (LPARs) of an IBM system. In such an environment, the memory of each configuration is isolated into a zone; each zone is kept separate and unique from the memory of other configurations by hardware mechanisms that are established by the hypervisor.

A physical communications adapter (e.g., channel-to-channel, and open systems) may be plugged between two partitions within the same system, or a virtualized communications adapter (e.g., hipersocket) may provide a firmware means by which messages may be interchanged. However, communication between multiple partitions currently requires that some form of I/O operation be performed by the guest configuration; even with high performance channel adapters or virtualized hipersockets, this is a less than optimal solution when compared with the possibility of directly interchanging data between configurations by sharing storage.

The hypervisor allots a subset of a physical system's memory to a logical partition establishing zone parameters for the partition. The zone parameters indicate the main storage zone origin (MSZO) and main storage zone limit (MSZL), specifying the system memory address range of the first and last byte of the partition's storage in system memory. The byte at system memory location MSZO is addressed by the logical partition as absolute zero, with the local partition addresses increasing upwards to the highest byte at MSZL−MSZO (i.e., MSZL minus MSZO). All storage above this location is not addressable by the logical partition. This process is known as relocation.

BRIEF SUMMARY OF THE INVENTION

An exemplary embodiment includes a method for providing a shared memory translation facility. The method includes receiving a request for access to a memory address from a requestor at a configuration, the receiving at a shared memory translation mechanism. It is determined if the memory address refers to a shared memory object (SMO), the SMO accessible by a plurality of configurations. In response to determining that the memory address refers to the SMO, it is determined if the configuration has access to the SMO. In response to determining that the configuration has access to the SMO, the requester is provided a system absolute address for the SMO and access to the SMO. In this manner direct interchange of data between the plurality of configurations is allowed.

Another exemplary embodiment includes a system for providing a shared memory translation facility. The system includes a SMO accessible by a plurality of configurations and a shared memory translation mechanism for executing a method. The method includes receiving a request for access to a memory address from a requester at a configuration, the receiving at a shared memory translation mechanism. It is determined if the memory address refers to the SMO. In response to determining that the memory address refers to the SMO, it is determined if the configuration has access to the SMO. In response to determining that the configuration has access to the SMO, the requester is provided a system absolute address for the SMO and access to the SMO. In this manner direct interchange of data between the plurality of configurations is allowed.

A further exemplary embodiment includes a computer program product for providing a shared memory translation facility. The computer program product includes a tangible storage medium readable by a processing circuit and storing instructions for execution by the processing circuit for performing a method. The method includes receiving a request for access to a memory address from a requestor at a configuration, the receiving at a shared memory translation mechanism. It is determined if the memory address refers to a shared memory object (SMO), the SMO accessible by a plurality of configurations. In response to determining that the memory address refers to the SMO, it is determined if the configuration has access to the SMO. In response to determining that the configuration has access to the SMO, the requestor is provided a system absolute address for the SMO and access to the SMO. In this manner direct interchange of data between the plurality of configurations is allowed.

BRIEF DESCRIPTION OF THE DRAWINGS

Referring now to the drawings wherein like elements are numbered alike in the several FIGURES:

FIG. 2 depicts a shared absolute address that may be implemented in accordance with an exemplary embodiment of the present invention;

FIG. 3 illustrates an exemplary shared memory object table entry; and

DETAILED DESCRIPTION OF EXEMPLARY EMBODIMENTS

An exemplary embodiment of the present invention provides a means by which a memory may be shared between multiple partitions. Exemplary embodiments provide an efficient means by which computer applications (with assistance from the operating system and hypervisor) can communicate directly with other applications on the same physical system, regardless of whether the applications are executing in separate logical partitions. The existing mechanisms of allocating storage to a logical partition by means of zone parameters are not changed.

In an exemplary embodiment, the hypervisor establishes one or more ranges of system addresses that are to be shared by multiple logical partitions, with an individual range of storage called a shared memory object (SMO). Alternatively, in response to a request made by an operating system executing in a logical partition, the entire storage of the logical partition may be made shareable by other logical partitions.

When the shared memory translation facility is installed, the handling of a logical partition's absolute addresses is enhanced. A model dependent arbitrary boundary is established, called the shared absolute base address (SABA). As used herein, the term "model dependent" refers to the fact that one particular machine model may have one SABA values and another (perhaps future) machine model may use a different SABA. When a storage request is made from a logical partition, and the absolute address is below the SABA, the absolute address is handled by means of zone relocation. When the absolute address is equal to or grater than the SABA, it is subject to shared memory translation as described herein.

Figure 1:
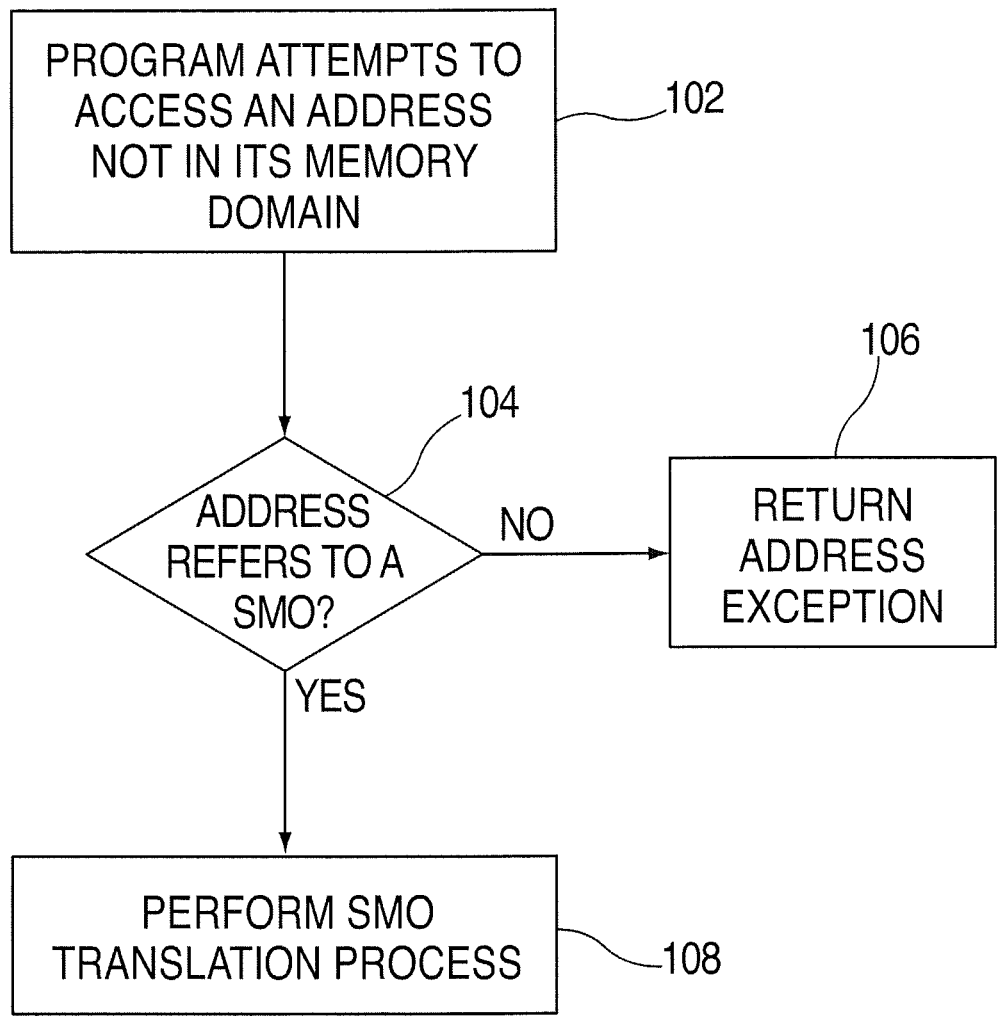
FIG. 1 is an exemplary process for providing a shared memory translation facility.

FIG. 1 depicts an exemplary process for providing a shared memory translation facility. At block 102 in FIG. 1, an operating system (OS) attempts to access an address that is not in the memory domain of the OS (or partition). As used herein, the term OS refers to both the operating system image itself as well as programs running within it. At block 104, it is determined if the address refers to a shared memory object (SMO) address. Block 106 is performed to return an address exception if the address does not refer to a SMO. If the address does refer to a SMO, then block 108 is performed. At block 108, the SMO translation process depicted in FIG. 4 below is performed.

An exemplary embodiment of how to implement shared memory translation is described below. Other implementations are possible without departing from the scope of the present invention.

Shared Memory Object Translation: When the SMO facility is not installed, or when an absolute address is less than the shared absolute base address (SABA), the address is a non-shared absolute address. When the SMO facility is installed, and an absolute address is greater than or equal to the shared absolute base address, the address, upon proper authorization, is called a shared absolute address and is subject to a model dependent shared memory object translation process.

In the absence of any other exception conditions, if the SMO translation process fails to translate the shared absolute address, an addressing exception condition is recognized, and the operation is suppressed.

Subject to external configuration mechanisms and program controls, a configuration's access to a SMO may be restricted to fetch only access. If a store is attempted to a SMO that is restricted to fetch only access, a protection exception condition is recognized, and the operation is either suppressed or terminated.

The following describes a format of the shared absolute address and a translation process that may be implemented by an exemplary embodiment of the present invention (e.g., a fixed storage mode guest).

FIG. 2 depicts a shared absolute address that may be implemented by an exemplary embodiment of the present invention. The address depicted in FIG. 2 is 64 bits in length. The address includes the element "S" to indicate whether this is a shared address. In an exemplary embodiment, when the address is a shared address, "S" is set to "1". The element "SMTX" is the SMO table index, the element "SMIN" is the SMO instance number, and the element "OBX" is the object byte index. "J" is equal to one more than the model dependent number of SMO index bits, and "K" is equal to "J" plus the model dependent number of SMO instance number bits. For example, if a model supports 2048 objects (11 bits of SMTX), and up to 16 instances (4 bits of SMIN), then J is equal to 12, and K is equal to 16.

Bit position 0 of the absolute address controls SMO translation. When the SMO facility is not installed, or when the S bit is zero, the address is a non-shared absolute address, subject to normal zone relocation. When the SMO facility is installed, and the S bit is one, the address is a shared absolute address, subject to SMO translation.

Bit positions 1 to J−1 of the shared absolute address contain the SMO table index. When the SMO facility is installed and the S bit is one, the SMTX is used as an index into the SMO table to locate a SMO table entry (SMTE). If the model implements a variable length SMO table, and the SMTX is greater than or equal to the number of entries in the table, an addressing exception is recognized.

Bit positions J to K−1 of the shared absolute address contain the SMO instance number. During SMO translation, the SMIN is compared with the instance number in the selected SMTE, and an addressing exception is recognized if they are not equal.

Bit positions K to 63 of the shared absolute address contain the object byte index (OBX). The OBX, appended on the left with K zeros, is added to the system absolute object origin, appended with one leftmost and sixty four minus "L" (64−"L") rightmost zeros, to form the 64 bit system absolute address within the SMO. "L" is a model dependent bit position representing the alignment of the SMO.

The following discussion proposes one possible format for the SMO table. This example embodiment is not intended to indicate a final architecture; rather, it is intended to illustrate the possible exception conditions that can be encountered in the translation process.

SMO Table: When SMO translation is performed, a model dependent number of the leftmost bits of the shared absolute address (excluding bit 0) are used as an index into the SMO table to locate a SMTE.

The origin, size, and alignment of the shared memory object table are all model dependent. A model may implement a full SMO table such that entries corresponding to all possible SMTX values are provided, or the model may implement a SMO table length control such that a variable length table may be utilized. The description below assumes that a full SMO table is implemented. The origin of the table is defined to be a model dependent address called the SMO table origin.

FIG. 3 illustrates one possible format of the SMTE supporting access control and store protection bits for 64 partitions. The subsequent description of fields and bit positions assumes that the table entry is as shown in FIG. 3. Referring to FIG. 3, "DRZ" is the donor relocation zone, and "IN" is the instance number. "L" is the model dependent bit position representing the alignment of the SMO. In this embodiment, the object is specified in units of $2^{(64-L)}$ bytes. "M" is the starting bit position of the donor relocation zone number, and "N" is the starting bit position of instance number. The instance number comprises the same number of bits as the SMIN field in FIG. 2. Thus, N=64−(K−J). "V" is the validity indicator.

Bit position 0 of the SMTE contains the SMTE validity bit ("V"). In an exemplary embodiment, the V bit is set to one to allow SMO translation to occur. Otherwise, an addressing exception is recognized.

Bit positions 1 to L−1 of the SMTE contain the system absolute object origin. The system absolute object origin, with one leftmost and 64−L rightmost zeros appended, forms the system absolute address of the first byte of the shared memory object.

Bit positions M to 63 of the SMTE contain the relocation zone of the configuration that donated the SMO. If the object is created from reserved storage, the DRZ field contains zeros.

Bit positions 1 to L−1 of the second doubleword in the SMTE, appended with a binary zero on the left and 64−L binary ones on the right, contain the system absolute address of the highest byte of the SMO. When the sum of the system absolute object origin and bits K to L−1 of the shared absolute address is greater than the system absolute object limit, an addressing exception is recognized.

Bit positions N to 63 of the second doubleword in the SMTE contain the instance number. The instance number is compared with the SMIN field in the shared absolute address, and an addressing exception is recognized if they are not equal.

Bits 0 to 63 of the third doubleword in the SMTE contain access control bits for each logical partition in the system, indexed by configuration's relocation zone (RZONE) number. When a configuration's bit is one, accesses to the shared memory object are permitted (subject to the restrictions of other protection controls). When a configuration's bit is zero, an addressing exception is recognized.

Bits 0 to 63 of the fourth doubleword in the SMTE contain store protection bits for each logical partition in the system, indexed by RZONE number. A store protection bit is meaningful only when the corresponding access control bit is one. When a configuration's access control bit is one and store protection bit is zero, store accesses to the SMO are permitted (subject to the restrictions of other protection controls). When the access control and store protection bits are both one, and a store access is attempted, a protection exception is recognized. In an alternate exemplary embodiment, the polarity of the access control and store protection bits is reversed.

Figure 4:
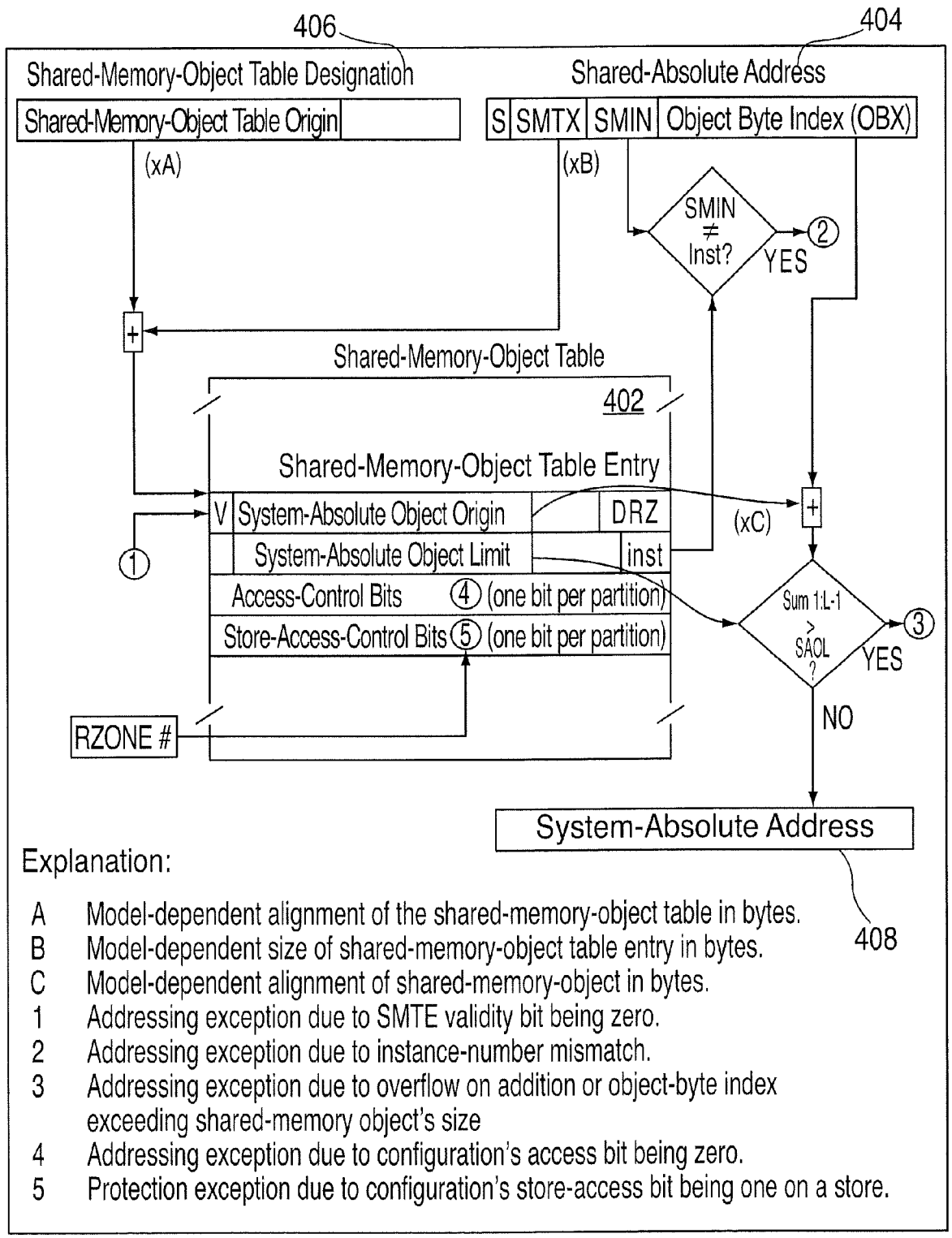
FIG. 4 depicts an exemplary process that may be implemented to perform a shared memory object translation.

FIG. 4 depicts an exemplary process that may be implemented to perform a SMO translation (e.g., for fixed memory mode guests). FIG. 4 includes a SMO table 402, a shared absolute address 404, a SMO table designation 406, and a system absolute address 408. When the SMO facility is not installed, or when the S bit (bit 0) of the absolute address is zero, zone relocation is performed as is usual. When the SMO is installed, and the S bit is one, zone relocation does not occur; rather, SMO translation is performed. In an alternate exemplary embodiment, the polarities are reversed: when the S bit is one, zone relocation is performed as usual; and when the S bit is zero, SMO translation is performed.

First, the SMTX is multiplied by the size of a SMTE entry; and this value is added to the SMO table origin to form the address of the shared memory object table entry (SMTE). When a carry out of bit position 0 occurs during the addition, an addressing exception may be recognized, or the carry may be ignored, causing the table to wrap from $2^{64}$ to zero. The validity bit of the selected SMTE must be one; otherwise, an addressing exception is recognized.

Next, the SMO instance number from the shared absolute address 404 is compared with the instance number in the SMTE. If the instance numbers are not equal, an addressing exception is recognized.

The contents of bit positions K to L−1 of the shared absolute address 404, padded on the left with K−1 zeros, are added to the system absolute object origin, padded on the left with one 0. If a carry into bit position 0 occurs as a result of this addition, or if the sum is greater than the system absolute object limit, then an addressing exception is recognized.

The configuration's RZONE is used as an index into the access control bits in the SMTE. If the bit corresponding to the logical partition is not one, then an addressing exception is recognized.

If the shared memory object access is a store access, the configuration's RZONE is used as an index into the store protection bits in the SMTE. If the bit corresponding to the logical partition is one, then a protection exception is recognized.

The object byte index (OBX), appended on the left with K zeros, is added to the system absolute object origin, appended with one leftmost and 64−L rightmost zeros, to form a 64 bit system absolute address 408 within the object. This system absolute address 408 is utilized to access the SMO.

The use of the S bit to distinguish between shared and normal absolute addresses as described herein is simply one example of an implementation of the SABA. Other methods of making this distinction may also be implemented by exemplary embodiments of the present invention. For example, the determination of where shared memory begins may be some combination of bits in the shared absolute address (as it will be for a virtualized implementation.)

Technical effects and benefits include the ability to directly interchange data between different configurations by sharing storage. In an exemplary embodiment, the sharing and storing of data is performed at memory speed.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD ROMs, hard drives, or any other computer readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

IBM® is a registered trademark of International Business Machines Corporation, Armonk, N.Y., U.S.A. Other names used herein may be registered trademarks, trademarks or product names of International Business Machines Corporation or other companies.

The invention claimed is:

1. A method for providing a shared memory translation facility, the method comprising:
   specifying, by a hypervisor or an operating system, a range of system absolute addresses that are accessible by a plurality of configurations as a shared memory object (SMO), the SMO comprising a range of memory locations supporting direct data interchange between the plurality of configurations;
   receiving a request for access to a memory location from a requestor at a configuration, the receiving at a shared memory translation mechanism and the request specifying a memory address of the memory location to be accessed at a partition absolute address, wherein the request comprises a shared memory indicator and a shared memory table index;
   determining that the shared memory indicator indicates that the memory location is in the SMO;
   locating in a SMO table a shared memory table entry based on the shared memory table index;
   determining whether the configuration has access to the SMO based on one or more access control bits of the shared memory table entry in the SMO table;
   providing the requestor a system absolute address for the SMO and direct access to the memory location in the SMO, the providing based on determining that the configuration has access to the SMO and the partition absolute address is greater than or equal to a shared-absolute base address, thereby allowing direct interchange of data between the plurality of configurations;
   based on the partition absolute address being less than the shared-absolute base address, handling the request for access by zone relocation of the partition absolute address; and
   generating an addressing exception based on determining that the configuration does not have access to the SMO.

2. The method of claim 1 wherein the requestor is an operating system.

3. The method of claim 1 wherein the determining that the shared memory indicator indicates that the memory location is in a SMO, the determining whether the configuration has access to the SMO, and the providing the requestor a system absolute address for the SMO are transparent to the requestor.

4. The method of claim 1 wherein the configuration is a logical partition.

5. The method of claim 1 wherein the access is fetch.

6. The method of claim 1 wherein the access is store.

7. A system for providing a shared memory translation facility, the system comprising a memory and a shared memory translation mechanism, the system configured to perform a method comprising:
   specifying, by a hypervisor or an operating system, a range of system absolute addresses that are accessible by a plurality of configurations as a shared memory object (SMO), the SMO comprising a range of memory locations supporting direct data interchange between the plurality of configurations;
   receiving a request for access to a memory location in the memory from a requestor at a configuration, the receiving at the shared memory translation mechanism and the request specifying a memory address of the memory location to be accessed at a partition absolute address, wherein the request comprises a shared memory indicator and a shared memory table index;
   determining that the shared memory indicator indicates that the memory location is in the SMO;
   locating in a SMO table a shared memory table entry based on the shared memory table index;
   determining whether the configuration has access to the SMO based on one or more access control bits of the shared memory table entry in the SMO table;
   providing the requestor a system absolute address for the SMO and direct access to the memory location in the SMO, the providing based on determining that the configuration has access to the SMO and the partition absolute address is greater than or equal to a shared-absolute base address, thereby allowing direct interchange of data between the plurality of configurations;
   based on the partition absolute address being less than the shared-absolute base address, handling the request for access by zone relocation of the partition absolute address; and
   generating an addressing exception based on determining that the configuration does not have access to the SMO.

8. The system of claim 7 wherein the requestor is an operating system.

9. The system of claim 7 wherein the determining that the shared memory indicator indicates that the memory location is in a SMO, the determining whether the configuration has access to the SMO, and the providing the requestor a system absolute address for the SMO are transparent to the requestor.

10. The system of claim 7 wherein the configuration is a logical partition.

11. The system of claim 7 wherein the access is fetch.

12. The system of claim 7 wherein the access is store.

13. A computer program product for providing a shared memory translation facility, the computer program product comprising:
   a tangible storage medium readable by a processing circuit and storing instructions for execution by the processing circuit for performing a method comprising:
   specifying, by a hypervisor or an operating system, a range of system absolute addresses that are accessible by a plurality of configurations as a shared memory object (SMO), the SMO comprising a range of memory locations supporting direct data interchange between the plurality of configurations;
   receiving a request for access to a memory location from a requestor at a configuration, the receiving at a shared memory translation mechanism and the request specifying a memory address of the memory location to be accessed at a partition absolute address, wherein the request comprises a shared memory indicator and a shared memory table index;
   determining that the shared memory indicator indicates that the memory location is in the SMO;
   locating in a SMO table a shared memory table entry based on the shared memory table index;
   determining whether the configuration has access to the SMO based on one or more access control bits of the shared memory table entry in the SMO table;

providing the requestor a system absolute address for the SMO and direct access to the memory location in the SMO, the providing based on determining that the configuration has access to the SMO and the partition absolute address is greater than or equal to a shared-absolute base address, thereby allowing direct interchange of data between the plurality of configurations;

based on the partition absolute address being less than the shared-absolute base address, handling the request for access by zone relocation of the partition absolute address; and generating an addressing exception based on determining that the configuration does not have access to the SMO.

14. The computer program product of claim 13 wherein the requestor is an operating system.

15. The computer program product of claim 13 wherein the determining that the shared memory indicator indicates that the memory location is in a SMO, the determining whether the configuration has access to the SMO, and the providing the requestor a system absolute address for the SMO are transparent to the requestor.

16. The computer program product of claim 13 wherein the configuration is a logical partition.

17. The computer program product of claim 13 wherein the access is one or more of fetch and store.

* * * * *